No. 735,733. PATENTED AUG. 11, 1903.
C. A. DUNHAM.
DRAIN VALVE.
APPLICATION FILED JULY 5, 1902.
NO MODEL.

WITNESSES:

INVENTOR
Clayton A. Dunham
BY
ATTORNEYS.

THE NORRIS PETERS CO., PHOTO-LITHO., WASHINGTON, D. C.

No. 735,733. Patented August 11, 1903.

UNITED STATES PATENT OFFICE.

CLAYTON AUBRA DUNHAM, OF MARSHALLTOWN, IOWA.

DRAIN-VALVE.

SPECIFICATION forming part of Letters Patent No. 735,733, dated August 11, 1903.

Application filed July 5, 1902. Serial No. 114,485. (No model.)

*To all whom it may concern:*

Be it known that I, CLAYTON AUBRA DUNHAM, a citizen of the United States, and a resident of Marshalltown, in the county of Marshall and State of Iowa, have invented new and useful Improvements in Drain-Valves, of which the following is a full, clear, and exact description.

My invention relates to improvements in drain valves or traps of that class which are equipped with thermostatic devices that automatically open and close the movable valve member by a change in the temperature of the fluid admitted to the valve-chamber, such a construction of valve being especially adapted for use in connection with steam-engine separators, heating systems, radiators, steam-cookers, and other places where a regular trap is not available.

One object of the invention is to provide an improved construction and arrangement wherein an expansion chambered diaphragm or disk is not exposed or subjected to any pressure except that which is discharged from the trap, thus making the device more effective and lasting than traps of this class.

A further object is to provide an improved valve member which is adapted to open in a manner to secure a fluid-passage of larger area than can be obtained by a single valve, so as to permit the passage of a larger volume of fluid, said valve also offering less resistance to the diaphragm and adapted to be seated by a slight pressure exerted inside said diaphragm, making the action of the trap quite sensitive.

A further object is to allow ready inspection, cleaning, and repair of the parts and to make provision for regrinding the valve and seats without removing the trap from the pipes.

With these ends in view the invention consists in the novel combination of devices and in the construction and arrangement of parts, which will be hereinafter fully described and claimed.

Reference is to be had to the accompanying drawings, forming a part of this specification, in which similar characters of reference indicate corresponding parts in both the figures.

Figure 1:
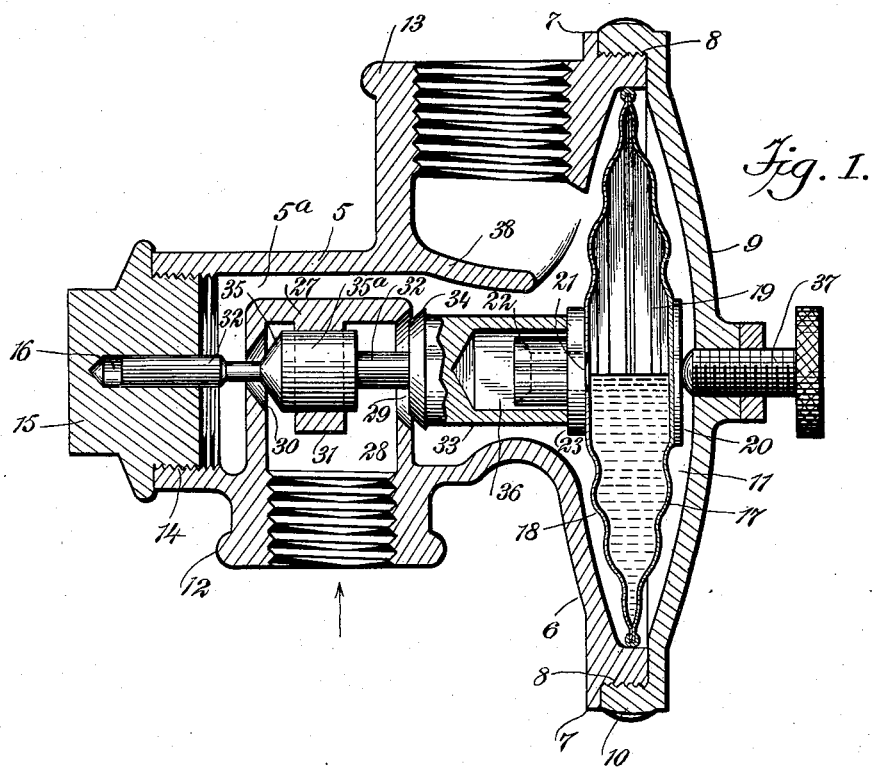
Figure 2:
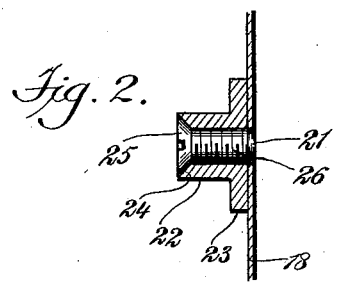

Figure 1 is a sectional elevation through a drain pipe or valve embodying my invention, and Fig. 2 is a fragmentary detail view illustrating the nozzle and the closure therefor of the chambered diaphragm.

The casing or body 5 of the valve is provided at one side with a circular wall 6, the latter having an annular flange 7 and a male threaded portion 8. A head 9 is provided with an annular interiorly-threaded flange 10, which is adapted to be screwed on the threaded portion 8 of the casing-plate, said head and the casing being disposed in coöperative relation in order to form the chamber 11, which is adapted to receive or contain the expansible diaphragm or disk, as shown by Fig. 1. The casing or body 5 is furthermore provided with an inlet-nipple 12 at its bottom and with an outlet-nipple 13 at its top, said nipples being in communication with the valve-chamber $5^a$ of the body and each being threaded for the application of pipes. (Not shown.) The end of the casing opposite to the head 9 is interiorly threaded at 14 for the reception of a flanged and threaded plug 15, the latter being removably secured to the body and provided with a longitudinal socket or cavity 16, the purpose of which will presently appear.

The chambered diaphragm consists of two members 17 18, which are preferably made of thin plates or disks of sheet metal, the same being stamped by suitable dies which impart the corrugated appearance thereto shown by Fig. 1. The metallic corrugated members of the chambered diaphragm are assembled in opposing relation, so as to form or produce the internal chamber 19, and these members are united at their edge portions by any suitable means, preferably by silver solder. The corrugated member 17 of the diaphragm is provided on its external surface with a wear-plate or washer 20, the same being also soldered in place, while the other corrugated member 18 is provided with a filling-port 21, the latter being surrounded by a nozzle 22, which is formed with a flange 23, that is soldered to the member 18, this construction being more clearly represented by Fig. 2. The nozzle 22 is interiorly threaded for a part of its length, and the passage is enlarged or flared at the outer end, so as to form a seat 24 for the reception of the flared or conical head 25 on the outer end of a threaded plug 26, the latter being screwed into the nozzle 22 for its flared head 25 to engage with the seat 24, thereby tightly closing the filling-nozzle of the chambered diaphragm.

A hollow bridge 27 is provided within the valve-chamber $5^a$ of the body or casing, said bridge being made integral with said casing. The bridge 27 is provided with a chamber 28, having direct communication with the passage of the nipple 12, the latter being overhung or spanned by the bridge. In one side or wall of the bridge is provided a seat 29, and another seat 30 is provided in the opposite side or wall of the bridge, the seat 30 being of smaller area than the seat 29. The two valve-seats 29 30 are disposed in coaxial relation to each other and to the cavity 16 of the removable plug, and between the valve-seats 29 30 lies the guide-lug 31, the latter being integral with the top part of the bridge and being in alinement with the valve-seats.

The valve consists of a stem 32, an enlarged head 33, a valve-face 34, and another valve-face 35. The valve is arranged in a horizontal position for its stem to extend through the valve-seats 29 30, the chamber 28 of the hollow bridge, and the cavity 16. The valve-face 35 is integral with an enlarged cylindrical portion $35^a$, the latter being fitted in the opening of the guide-lug 31, whereby the valve is sustained slidably in the lug 31 and the plug 15, so that it may move freely in a horizontal direction. The head 33 of the valve-stem is disposed within the chamber $5^a$ of the casing, so as to have opposing or engaging relation with the member 18 of the chambered diaphragm, and one end of this head 33 is fashioned to form the valve-face 34. The head 33 is also provided with an angular or square socket 36, and into this socket of the head is adapted to extend the filling-nozzle 22 of the chambered diaphragm, thus compactly disposing the diaphragm and the valve in a manner to house the filling-nozzle. The valve-faces 34 35 are of different area, and they are respectively adapted to occupy the seats 29 30 of the hollow bridge.

37 designates an adjusting-spindle which is screwed into an opening provided centrally in the removable head 9, the inner end of said spindle engaging frictionally with the wear-plate 20 of the chambered diaphragm.

It is evident that the head 9 may be unscrewed from the casing or body and the chambered diaphragm may be removed in order to permit access to the filling-nozzle. The plug 26 may be unscrewed from this nozzle and the proper quantity of sensitive liquid may be poured into the chamber 19. Any highly-volatile fluid, such as ammonia, may be employed as a means for securing sensitive expansion or contraction of the chambered diaphragm with changes in temperature of the liquid which is admitted to or flows through the drain-trap. The plug 26 may be screwed into the nozzle in order to tightly close the chamber against evaporation of the sensitive fluid therein, and the chambered diaphragm may be replaced within the chamber 11, so that its filling-nozzle will enter the cavity of the valve-head, after which the head 9 should be replaced on the casing or body.

It is evident that the casing-head 9 and the diaphragm may be removed to permit access to be obtained to the valve, and this valve may be reground by spreading a little oil and emery over the valve-faces 34 35, after which an implement, such as a brace, may be thrust into the socket 36, whereby the valve-spindle may be rotated in order to true or restore the valve-surfaces. This operation of regrinding the valve may be performed without removing the casing from the pipes.

38 designates a deflector which is in the form of a plate or web that extends from one side of the nipple 13 toward the diaphragm member 18. This deflector is arranged to direct the water of condensation against the diaphragm, so as to add to the sensitiveness of the same.

I prefer to employ a double valve having its parts arranged to seat themselves against the openings of different area, thereby securing a larger area of valve-opening for the passage of fluid than can be attained by the use of a single valve, whereby the larger volume of water is permitted to pass the valve when it is opened.

The parts of the valve are so arranged that the chambered diaphragm is not subjected to any pressure but that which is discharged from the trap. This makes the diaphragm more effective and lasting than if it were exposed to initial pressure, and the durability of the diaphragm is increased, because it is not liable to crack or break at the soldered joints which unite the corrugated members. This diaphragm is also continually surrounded by water as it escapes through the trap, thereby insuring the quickest possible absorption of the heat and radiation of the same as conditions require. The trap is quite simple in its construction and operation, owing to the absence of weights, springs, or floats, and it is adjustable to discharge at any temperature without loss of steam.

Having thus described my invention, I claim as new and desire to secure by Letters Patent—

1. A drain-trap comprising a casing having valve-seats of different area and arranged in the direction of the longitudinal axis of said casing, an inlet at the bottom of the casing, a port at the top of the casing, a vertically-disposed chambered diaphragm mounted in the casing adjacent to the port in the top thereof, and a longitudinally-slidable valve having endwise engagement with the diaphragm and provided with valve-faces adapted to occupy the valve-seats.

2. A drain-trap comprising a casing having a bridge provided with valve-seats of different area, a removable cover at one end of the casing, a chambered diaphragm removably held between the casing and its cover, and a slidable double valve mounted for movement longitudinally in said casing and disposed to engage endwise with the diaphragm.

3. A drain-trap comprising a casing or body, a hollow bridge disposed within said body and provided with valve-openings of different area and with an intermediate guide-lug, a plug having a guide-cavity, a valve slidably fitted in said lug and the plug and provided with valve-faces adapted to close said valve-openings, and a chambered diaphragm in coöperative relation to the valve.

4. A drain-pipe comprising a casing, a valve slidably mounted therein and provided with a socketed head, a diaphragm, and a removable casing-head, whereby the head and the diaphragm may be displaced to obtain access to the headed valve.

5. A drain-trap comprising a casing, a diaphragm consisting of corrugated members, one of which is provided with a filling-nozzle, a closure for said nozzle, and a valve mounted in the casing and provided with a socketed head which is arranged to receive the filling-nozzle of said diaphragm.

6. A drain-trap having a chambered casing provided with an inlet in its bottom and a port in the upper side thereof, a vertically-disposed chambered diaphragm held in said casing adjacent to the port therein, a valve controllable by the expansion or contraction of the diaphragm, and a deflector extending across the port, toward the diaphragm, and arranged to direct return water from the port against the diaphragm.

7. A drain-trap consisting of a casing having valve-openings of different area, a double valve slidably mounted in the casing and provided with a socketed head, a diaphragm having a filling-nozzle which is received in said socket of the valve-head, and a deflector disposed between the valve-head and the outlet from the casing and extending toward the diaphragm.

In testimony whereof I have signed my name to this specification in the presence of two subscribing witnesses.

CLAYTON AUBRA DUNHAM.

Witnesses:
GEO. F. A. WALKER,
E. G. BEESON.